United States Patent [19]

Chaum

[11] Patent Number: 5,434,919
[45] Date of Patent: Jul. 18, 1995

[54] COMPACT ENDORSEMENT SIGNATURE SYSTEMS

[76] Inventor: David Chaum, 14652 Sutton St., Sherman Oaks, Calif. 91403

[21] Appl. No.: 179,962

[22] Filed: Jan. 11, 1994

[51] Int. Cl.$^6$ .............................................. H04L 9/30
[52] U.S. Cl. .................................................... 380/30
[58] Field of Search ................................... 380/25, 30

[56] References Cited

U.S. PATENT DOCUMENTS

| | | | |
|---|---|---|---|
| 4,885,777 | 12/1989 | Takaragi et al. | 380/30 |
| 4,935,962 | 6/1990 | Austin | 380/30 |
| 4,987,593 | 1/1991 | Chaum | 380/30 |
| 5,016,274 | 5/1991 | Micali et al. | 380/30 |
| 5,131,039 | 7/1992 | Chaum | 380/25 |
| 5,140,634 | 8/1992 | Guillou et al. | 380/30 |

FOREIGN PATENT DOCUMENTS

| | | |
|---|---|---|
| 0439847A1 | 8/1991 | European Pat. Off. . |
| WO89/08957 | 9/1989 | WIPO . |
| WO90/04892 | 5/1990 | WIPO . |

OTHER PUBLICATIONS

Chaum et al, "Untraceable Electronic Cash", Advances in Cryptology—Crypto '88, pp. 319–327.

Even et al, "On-line/Off-line Digital Signatures", Advances in Cryptology—Crypto '89, pp. 263–275.

Bos et al, "SmartCash: A Practical Electronic Payment System", CWI Technical Report CS-R9035.

Diffie et al, "New Directions in Cryptography", IEEE Transactions on Information Theory, vol. IT22, No. 6, No. '79, pp. 644–654.

Lamport, "Construction Digital Signatures from a One Way Function", SRI Technical Report CSL-98.

"Matrix Digital Signature for Use with the Date Encryption Algorithm", IBM Technical Disclosure Bulletin, vol. 28, No. 2, Jul. 1985, pp. 603–604.

Merkle, "A Digital Siganture Based on a Conventional Encryption Function", Advances in Cryptology—Crypto '87, pp. 369–378.

Chaum et al, "Undeniable Signatures", Advances in Cryptology—Crypto '89, pp. 212–216.

Primary Examiner—Salvatore Cangialosi
Attorney, Agent, or Firm—Nixon & Vanderhye

[57] ABSTRACT

Cryptographic methods and apparatus for issuing (101), endorsing (102), and verifying (103, 104) compact endorsement signatures are disclosed. Such signatures allow an endorser to provide a public-key verifiable signature on a chosen message more efficiently than if the endorser were to make a public key signature, since the endorser needs only to perform conventional cryptographic operations and has to store less data per signature than required by previously known endorsement schemes.

A hierarchy of compression functions takes a plurality of one-time signatures into the value upon which the public key signature is formed. Each endorsement uses up one of the one-time signatures and provides a subset of inputs to the compression hierarchy sufficient to allow its evaluation. Preparation for subsequent endorsements is made by pre-evaluating one-time signatures and saving only some of the intermediate values of the compression hierarchy.

6 Claims, 7 Drawing Sheets

|     |       |       |       |       |     |       |       |       |
|-----|-------|-------|-------|-------|-----|-------|-------|-------|
| 1.  | a11.  | a12   | a13   | a14   | -   | a2    | a3    | a4    |
| 2.  | a11   | a12.  | a13   | a14   | -   | a2    | a3    | a4    |
| 3.  | >b11  | >a22  | a13.  | a14   | -   | a2    | a3    | a4    |
| 4.  | >b12  | a22   | >a23  | a14.  | -   | a2    | a3    | a4    |
| 5.  | >a21. | a22   | a23   | >a24  | >a1 | -     | a3    | a4    |
| 6.  | a21   | a22.  | a23   | a24   | a1  | >B21  | a3    | a4    |
| 7.  | >b21  | >a32  | a23.  | a24   | a1  | >B22  | a3    | a4    |
| 8.  | >b22  | a32   | >a33  | a24.  | a1  | >A2   | a3    | a4    |
| 9.  | >a31. | a32   | a33   | >a34  | >b1 | A2    | -     | a4    |
| 10. | a31   | a32.  | a33   | a34   | b1  | A2    | >B31  | a4    |
| 11. | >b31  | >a42  | a33.  | a34   | b1  | A2    | >B32  | a4    |
| 12. | >b32  | a42   | >a43  | a34.  | b1  | A2    | >A3   | a4    |
| 13. | >a41. | a42   | a43   | >a44  | >b2 | A2    | A3    | -     |
| 14. | a41   | a42.  | a43   | a44   | b2  | A2    | A3    | >B41  |
| 15. | >b41  | >A12  | a43.  | a44   | b2  | A2    | A3    | >B42  |
| 16. | >b42  | A12   | >A13  | a44.  | b2  | A2    | A3    | >A4   |
| 17. | >A11. | A12   | A13   | >A14  | -   | A2    | A3    | A4    |
| 18. | A11   | A12.  | A13   | A14   | -   | A2    | A3    | A4    |

Fig. 5

COMPACT ENDORSEMENT SIGNATURE SYSTEMS

BACKGROUND OF THE INVENTION

1. Field of the Invention

This invention relates to digital signature systems, and more specifically to cryptographic techniques involving the combination of a public-key digital signature with conventional techniques for cryptographic authentication.

2. Description of Prior Art

Reference is hereby made to P.C.T. publication WO 89/08957, E.P.O. filing 89905483.7, and U.S. Pat. No. 4,987,593, filed Mar. 16, 1988, titled "One-show blind signature systems," by the present applicant, which are incorporated herein by reference. Reference is also hereby made to E.P.O. filling 90200207.0 and U.S. Pat. No. 5,131,039, filed Jan. 29, 1990, titled "Optionally moderated transaction systems," by the present applicant, which are incorporated herein by reference.

A basic technique for "endorsing" a public key digital signature was disclosed in the first above included reference and a related paper presented at Crypto '88. This technique was used in the second above included reference and also in other subsequent publications, such as, for example, U.S. Pat. No. 5,016,274 by Micali et al related to a paper presented at Crypto '89 and CWI technical Report CS-R9035.

Endorsement schemes are simply one-time signature schemes where the authentication of the public key that is always needed in one time signature schemes is done using the very well know technique of a public key certificate.

Three efficiency improvements for the endorsement function, compared to that first disclosed in the first above included reference, are known in the prior art. The first two pertain to one-time signature schemes and the third improves the true public key digital signatures.

The first two improvements were made in the context of the well-know original one-time signatures called "Lamport" signatures that are disclosed and attributed to Lamport in "New directions in cryptography," IEEE Transaction on Information Theory, pp. 644, 654, 1976, and are also subsequently described by Lamport in SRI technical report CSL 98. Lamport signatures simply authenticate, as a public key, the output of a public one-way function on a list of secret values; later release of a subset of the secret values allows anyone to confirm both that they correspond to the authenticated list and the message signed by being encoded in the choice of subset.

The first improvement is believed disclosed at least in IBM Technical Disclosure Bulletin, vol. 28, No. 2, Jul. 1985, pp. 603–604, titled "Matrix digital signature for use with the data encryption algorithm" and in the Proceedings of Crypto '87 by Merklle in the context of Lamport signatures and was subsequently incorporated in the second above included reference by the present applicant. This first improvement reduces the size of the original list of secret inputs to the one-way function. Instead of simply basing the signature on single independent applications of one-way functions, the functions are composed or "chained" so that the output of the previous function application in the chain serves as the input of the next function application. Each chain can be thought of as representing one digit of the numeric message signed by the one-time scheme. The radix is one plus the length of the chain, with the original Lamport signatures having radix 2. This first improvement results in economy of storage and transmission, at the expense of an increase in computation.

The second efficiency improvement was also disclosed by Merkle, as cited above. It applies techniques, believed known in the coding art, that reduce the number of "control" digits needed. These digits prevent a signature from being changed into a signature on a different message. The previous disclosures cited used one control digit per message digit, with the control digit representing the additive inverse of the message digit. The improvement works essentially by having only a few control digits that represent the additive inverse of the sum of the message digits. Accordingly, the number of control digits is reduced from being linear in the number of message digits to being only logarithmic.

The third improvement applies to certain public key digital signature schemes. It was disclosed first in U.S. Pat. No. 4,949,380, in a paper presented at Crypto '89, PCT publication US89/04662, and EPO application 89912051.3, all substantially the same and all by the present applicant. This improvement allows plural public key signatures to be "intermingled" in the space taken by one, so long as they are made with coprime public exponents. They can be signed in the intermingled form, stored in that form, and later separated for showing. This technique also gives economy of storage (and communication), although potentially at the expense of extra computation.

One commercially interesting use of endorsement schemes appears to be in the area of "prepaid cards."

A prepaid smart card contains stored value which the person holding it can spend at retail points of payment. After accepting stored value from cards, retailers are periodically reimbursed with actual money by system providers. A system provider receives money in advance from people and stores corresponding value onto their cards. During each of these three kinds of transactions, secured data representing value is exchanged for actual money or for goods and services. Telephone cards used in France and elsewhere are probably the best known prepaid smart cards (though some phone cards use optical or magnetic techniques). National prepaid systems today typically aim to combine public telephones, merchants, vending, and public transportation. Automatic collection of road tolls may also be included soon.

Growth in the prepaid smart card market appears to be rapid. For instance, at the time of this application it is believed that national prepaid chipcard schemes are rolling out in Denmark, under construction in Portugal, and planned in Belgium, Spain, and France. The MAC network, believed the largest ATM network in the United States, has announced its entry, and systems are apparently already operational in South Africa and Switzerland.

In schemes based solely on conventional cryptography used by cards, secured modules (sometimes called SAM's) are needed at every point of payment. The reason is that transactions are consummated without communication with external sites, to keep transaction costs commensurate with the low-value of payments, and that conventional cryptographic authentication requires the communicants to share a common secret. Each secure module is believed to require the ability to develop secret keys of all cards, which gives some problems. If the cards of multiple system providers are to be accepted at the same point of payment, all the points of payment must have secured modules containing keys of every provider. This is believed to mean either a mutually trusted module containing the keys of multiple providers, which might be hard to achieve, or one module per provider, which becomes impractical as the number of providers grows. Furthermore, in any such system, if a module is penetrated, not only may significant retailer fraud be facilitated, but the entire card base may be compromised.

Endorsement schemes avoid these problems since they do not require such secured modules. Equipment at points of payment needs no secret keys, only public ones, in order to authenticate the endorsements, which act like guaranteed checks filled in with all the relevant details. These same endorsements can later be verified by the system provider for reimbursement. (While these systems allow full end-to-end verification, tamper-resistant aggregators can always be used for truncation.) They also allow the cards of any number of issuers to be accepted at all retailers; retailers cannot cheat issuers, and issuers cannot cheat each other.

The size of the chip in the card is of substantial practical importance in such systems. With a given technology, the more storage the more the chips cost to produce and the bigger they are. It is believed that in the industry larger chips are also thought to mean higher card production costs, and less reliable and durable cards. Cards announced so far for such national prepaid systems use only conventional cryptographic authentication and have only about one kilobyte of nonvolatile storage. For endorsement techniques to be competitive, it is believed important that they can be fit into the same chips. Prior art techniques do not allow enough endorsements to be stored in such chips.

Furthermore, it is believed that ordinary credit card and/or debit card transactions consummated using a smart card would benefit from the additional security of an off-line public key endorsement of their transaction details.

OBJECTS OF THE INVENTION

Accordingly, it is an object of the present invention to:
improve the storage requirements of endorsement signature devices, such as smart card chips used in prepaid applications;
provide advantageous tradeoffs between storage on the card, processing time, and the amount of data communicated;
increase the number of transactions that can be conducted by a commercially available smart card chip;
expand the set of possible commercial applications of endorsement technology beyond prepaid cards, including handling of credit card and/or debit card transactions;
let a single card handle both prepaid and other credit/debit card transactions;
allow incorporation of any public key signature systems in practical realizations of the inventive concepts disclosed herein; and
allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

FIG. 4 shows a preferred exemplary endorsement structure in accordance with the teachings of the present invention, in which

FIG. 5 shows the operational steps in accordance with the teachings of the present invention of the exemplary structures of FIG. 4 by means of a tabular arrangement of registers names and notations.

BRIEF SUMMARY OF THE INVENTION

Figure 1A:
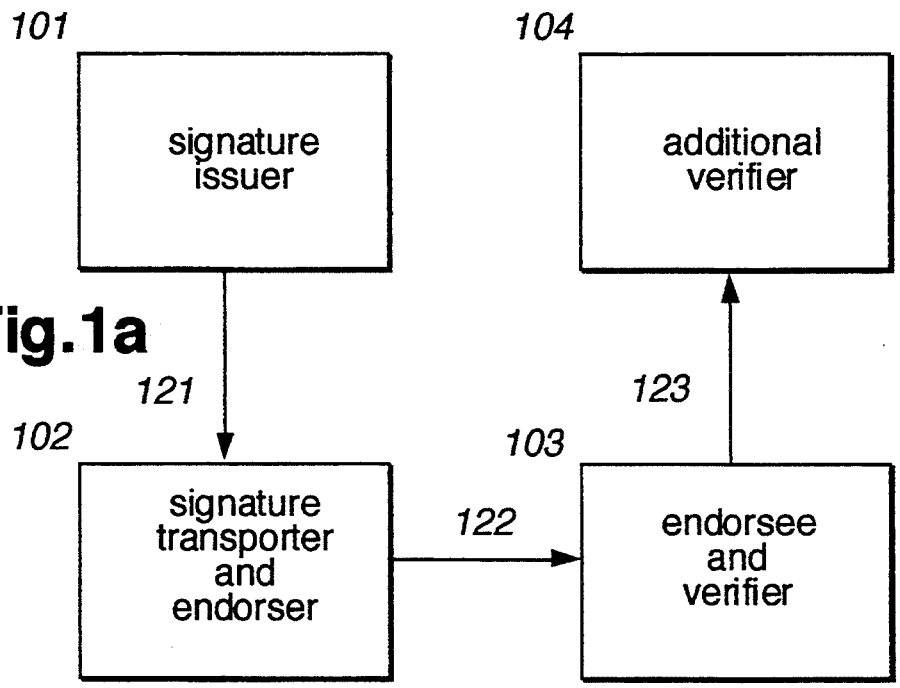
FIG. 1a shows a combination block and functional diagram of a preferred embodiment of a compact endorsement signature system involving four sets of parties in accordance with the teachings of the present invention.

In accordance with the forgoing and other objects of the present invention, a brief summary of some exemplary embodiments will now be presented. Some simplifications and omissions may be made in this summary, which is intended to highlight and introduce some aspects of the present invention, but not to limit its scope in any way. Detailed descriptions of preferred exemplary embodiments adequate to allow those of ordinary skill in the art to make and use the inventive concepts are provided later.

An endorsement scheme that allows preferably hundreds of endorsements to be stored in less than a thousand bytes on a simple microcontroller smart card would be commercially interesting, but cannot be achieved by techniques known in the prior art. The present invention overcomes these limitations of the prior art.

The inventive concept provides hierarchical structuring of multiple one-time signatures within a single public key signature. The hierarchy is formed from compressing one-way functions, also sometimes known as hash or message digest functions, serving as the internal "nodes" in a special tree structure. The tree's "leaves" are the one-time signatures and its "edges" are values that are inputs and sometimes outputs of the compression functions. Thus the root represents the final compression of all the one-time signatures in the structure, and the output of this compression is singed by the digital signature technique.

Each endorsement involves a subset of the tree including the single one-time signature that is used in, and only in, that endorsement. Also in the subset is the public key signature and a path of edges from the leaf to the root. The values represented by all edges incident on the nodes of the path, apart from those edges on the path, are included.

The endorsements are made in an order that, in cooperation with the structuring, lets the card use a relatively small number of non-volatile registers at each stage. Furthermore, the amount of computation required between each endorsement is also limited to a small amount. Moreover, stepping from the last one-time signature in one digital signature to the first of the next digital signature requires essentially only the same resources as stepping between any two one-time signatures within the same digital signature.

The particular preferred embodiment, which is disclosed in detail later, uses a "cascade" of two-argument compressing functions as a building block. The first compressing function in the cascade takes two inputs from outside the cascade. All subsequent compresses in the cascade take one argument from the previous compress and one from outside the cascade. Thus, with only an output of one compress in a cascade along with all subsequent inputs to the cascade, the output of the entire cascade can be verified.

The cascades are structured into a low hierarchy, preferably only two high, although any hierarchy could be used. The cascades at the low level, called "streets," take their inputs directly from one-time signatures, called "houses." The cascades at the higher level, called "towns," take their inputs from the outputs of the cascades at the lower level. Thus, a complete ordering is imposed on the houses of a street and the streets of a town.

Roughly stated, in the preferred embodiment, the endorsements may be thought of as proceeding from house to house in order. When a house is visited, its one-time signature is used in an endorsement. In addition to this "actual" traversal for endorsements, there are two "preparatory" traversals conducted in parallel.

The first preparatory traversal moves down the next street visiting almost all the houses. (If there is a next street in the current town ordering, this is traversed; if there are no more streets in the current town, then the first street in the next town is traversed). The purpose of the first preparatory traversal is to obtain and store the leaf edges for a street so that they are ready when that street is entered and the first house is used in an endorsement.

The second preparatory traversal moves through the next town. The purpose of this traversal is to obtain and store the edges coming from all the streets of the next town, except the first street. These will be needed in endorsements when the new town is initially entered by the actual traversal and endorsements are coming from its first street.

GENERAL DESCRIPTION

The drawing figures and the detailed descriptions provided later make a number of simplifying assumptions for concreteness and for clarity in exposition. It will be appreciated, however, that these should not be taken to limit the scope of the invention.

Some background on the parameter values that are believed to apply, as will be appreciated, serves as a basis for some of the tradeoffs made in the preferred embodiment.

A typical user transaction should, it is believed, not introduce more than roughly a second of delay if it is to be perceived as acceptably fast. Of course, highway-speed road tolls, and even mass transit situations, may require substantially faster transactions. The endorsement signatures are well suited to such high-speed transaction, as has been illustrated in the second above included reference.

An RSA signature today is minimally 64 bytes. Other digital signatures might be one third the size. The output of a compressing one-way or hash function is typically 16 bytes. A one-way function input or output can typically be 8 bytes. A smart card of one kilobyte non-volatile memory, already mentioned as a currently commercially interesting target for the invention, typically has various competing uses for its non-volatile storage. It is believed that less than the whole amount would be available for storage of signatures and other values needed in endorsement. Examples include identification data related to manufacturing and distribution, cryptographic keys for securing communication with an issuer, registers to hold card balance(s) or limit(s), transaction records, public key certificates of the issuer, key validity data, and so forth.

A blockcipher operation that might typically be used in constructing a one-way function can, it is believed, typically be done by a smart-card microcontroller between 100 and 400 times per second, depending on a variety of factors. At least several applications of such a blockcipher are anticipated to be required to implement a hash or compression function. A reading device can use special circuitry to compute blockciphers, it is believed, about two orders of magnitude faster.

Transmission of data between a smart card and the reading device is believed typically to be at about 1000 bytes per second, but can be sped up by at least a factor of 4 under some standard protocols.

Some general notions regarding cryptographic techniques will now be presented.

Assigning a variable a "random" value performs the function of creating a value that should not be readily determined by at least some party. Many means and methods are known in the art for generating such unpredictable quantities, often called keys. Some are based on physical phenomena, such as noise in semiconductors, or patterns detected in humans pushing buttons, or possibly deterministic cryptographic techniques sometimes called pseudorandom generators. It is well known in the art that these various techniques can often be combined, and that post-processing can often improve the results. Thus the particular means or methods whereby random values are derived is not essential to the present invention, and it is anticipated that any technique may be employed in this regard.

A "compression" function, as has already described, is an example of a technique very well known in the art as a hash or message digest function. Such a function takes an input larger than its output. It is believed computationally prohibitive, given the output, to find back any input that would yield it, even if some of the inputs are known.

The term "party" is used herein to indicate an entity with control over at least the secrecy of some information, usually at least one key. It is anticipated that a plurality of people may each know all or in effect part of some key, and they might be thought of collectively as a party. In other cases, a key may be substantially unknown to people, and reside in some physical device, and then the device itself or those who control it from time to time may be regarded as parties.

The method or means whereby information is transferred between parties is not essential to the present invention, and may be accomplished in any suitable way. For instance, output and input means may be brought into physical proximity with each other, or they may communicate remotely by any kind of communication network or technique. The information may be encoded in various forms, some of them cryptographic, and decoded and transformed between coding on its way. Similarly the information may be stored and/or detained in various forms and by various parties along the way.

The choice of party names, forms, and the number of parties are examples of choices made for clarity and convenience. Naturally, the inventive concepts disclosed here should not be interpreted as limited to a particular type, grouping, or multiplicity of parties nor should there be any other implications of naming conventions or the like.

Turning now to FIG. 1a, general descriptions of the interconnections and cooperation of the constituent parts of some exemplary embodiments of the inventive concepts will now be presented.

Signature issuer party 101, referred to for simplicity as the issuer, has at least a private key. A corresponding public key is made known at least to endorsee 103 (as will be more fully described) and to any additional verifiers 104.

Signature transporter and endorser party 102, herein referred to simply as endorser, receives the signatures from issuer 101 as shown by line 121. Endorsee and verifier 103, referred to for simplicity as endorsee 103, receives an endorsement from endorser 102 as indicated by line 122. Additional verifier 104 may also verify the endorsement, shown for simplicity as coming form endorsee over line 123.

As will be appreciated, but is not shown for clarity, there may be plural instances of each party type. For example, there may be multiple endorsers, each endorsing signatures issued by the same issuer. There may be multiple endorsees, each capable of receiving an endorsement from any one of plural endorsers. There may be multiple additional verifiers, any one of which may be capable of verifying endorsements received from plural endorsees or others. Moreover, there may be plural issuers, some of which are capable of issuing identical signatures as well as others of which that are not.

Each signature is related to a message, the origin of which is not essential to the inventive concepts. Messages could, for example, come from the issuer 101, the endorser 102, endorsee 103, or verifier 104, random sources, external events, or combinations of these. Any of the aforementioned parties may be aware of the message before they cooperate in an endorsement, or one or the other of them may supply all or parts of the message to the other, which is not being shown for clarity.

Figure 1B:
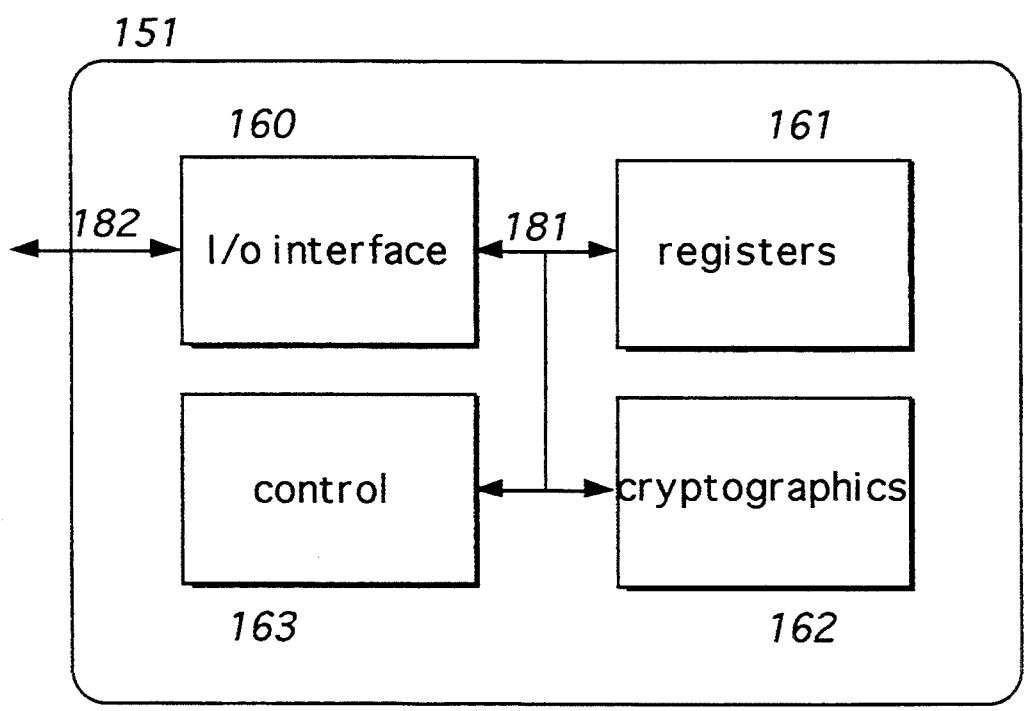
FIG. 1b shows a combination block and functional diagram of an exemplary embodiment of an endorser party in accordance with the teachings of the present invention.

Turning now to FIG. 1b, general descriptions of the interconnections and cooperation of the constituent parts of some exemplary embodiments of the inventive concepts will now be presented for endorser 102.

A smart card 151 or other portable data carder, as will be appreciated, may perform the role of endorser 102. It may be considered to be composed of several interconnected parts. The i/o interface 160 communicates with the outside world, such as issuer 101 and endorsee 103 through interface link 182, which may be galvanic contacts or contactless technology, as are well known in the smart card art. Also there may be special circuits or firmware for computing cryptographic functions 162. Furthermore, control means 163 manages the operation and coordination of the other parts. Most important for the present purposes are registers 161 for storing values. These may be regarded as of two types, nonvolatile and temporary. All these components may cooperate together and/or with the i/o interface 160, through mutual interconnection means shown for simplicity as bus 181. An example embodiment would be in the Motorola SC-24 smart card chip, or near equivalents manufactured by Thompson Semiconductors for instance, and these may be embedded in industry standard smart cards.

Figure 2:
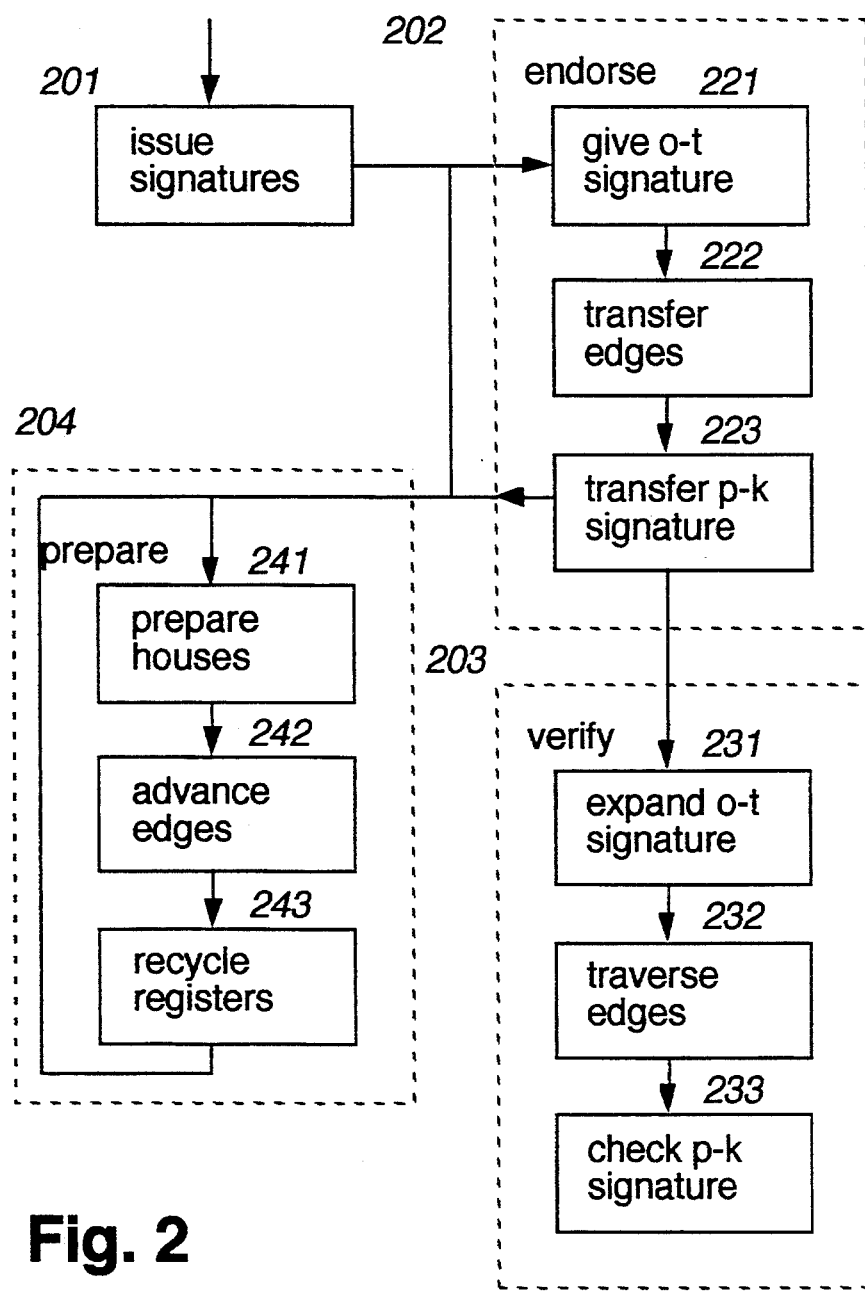
FIG. 2 shows a flowchart of a general endorsement scheme process in accordance with the teachings of the present invention.

Turning now to FIG. 2, general descriptions of the function and process steps of some exemplary embodiments of the inventive concepts will now be given.

The first step, as shown by flowchart box 201, is the issuing of a compact endorsement signature by the issuer 101 to the endorser 102. This entails creating in turn all the houses and the edges. Then a digital signature is formed on the root output as already described. Although not shown explicitly for clarity, it will be understood that blind signature techniques could be used in the issuing process. For instance, it will be readily understood by those of skill in the art, an intermediary party not shown for clarity could form the one-time signatures and compression tree, provide it to a signer in a blinded form, and supply an unblinded form of the result to the endorser. Related techniques are also disclosed in the second above included reference.

Dashed box 202 shows the endorse function. One component is box 221 which forms a one-time signature that corresponds to the message. This is done by developing each digit to the point in the cascade required to encode the part of the message or the control, as is well known in the one-time signature art and as will also be described in more detail with reference to FIG. 3. This signature is given from the endorser to the endorsee 103 for verification. The transfer of at least the edges needed to verify the signature, as already mentioned, is shown in box 222. The digital signature is also provided from the endorser to the endorsee as shown in box 223.

Dashed box 203 represents the verification function performed by the endorsee on the compact endorsement signature provided as a result of the already mentioned dashed box 202. First the one-time signature is shown as expanded in box 231, which would for instance be the form with the most applications of the one-way function(s) applied. The result of this can then be used together with the edges supplied in box 222, already mentioned, to traverse by application of compression function nodes all the way to the root. This results in the value upon which the digital signature mentioned already with reference to box 221 is checked, as shown in box 233. The signature need not be the type known in the art as that allowing "message recovery," since the edges of the compression tree are provided. Of course if the signature verifies, then the endorsee accepts it, otherwise not.

Dashed box 204 depicts the preparation process. It may involve substantial computation between each endorsement, but it may also involve no computation, as indicated by the straight through return path. One aspect of preparation, indicated by box 241, entails evaluating houses. These may for instance, and as already mentioned, be in the next street or town. When houses are fully evaluated the results will serve as input edges to compression nodes, as already mentioned. Box 242 depicts the compression of edges and the saving in registers of the results, which may free up the need to store involved input registers or house outputs. Also as non-volatile storage becomes available to store new values, the old values should be erased or at least written over by the new values, as indicated by box 243.

As would be appreciated by those of ordinary skill in the art, these various preparation steps could be performed at various times and in various orders without departing from the spirit of the present invention. For instance, in some settings the preparation may produce exactly what is needed for the next endorsement; in other cases, some preparation for a number of future endorsements may be made whenever there is time to do so. Although such preparation for future endorsements is not shown explicitly for clarity, it will be understood that employing some extra registers and storing in them the values that would be calculated some steps in advance, allows for such steps to be taken without requiring preparation.

Preparation may be made just before an endorsement or just after an endorsement or during an endorsement or while the endorser is idle. Another possibility, without attempting to be exhaustive, may occur substantially soon after a signature issuing, or at another time when no preparation is needed and the whole preparation dashed box may be passed through.

With reference to the above mentioned application of credit/debit card transactions and the like, some novel extensions to the operation shown in FIG. 2 just described will now be disclosed that are not shown for clarity but that will be understood by those of skill in the art.

Both on-line and off-line transactions are considered here. In a first type of on-line transaction, there may be at least a challenge issued on-line to an endorser and a response back on-line from the endorser, the concept of such challenge response protocols being well known in the art. The endorser might typically be a smart card.

In a second type of on-line application a transaction may comprise a single message sent on-line from the terminal receiving the endorsing card and a single corresponding response received by the terminal on-line from a server. In this second type of transaction, it will be understood by those of skill in the art that the message endorsed should contain a challenge value and that this challenge value is preferably derived from a "challenge seed" substantially at least influenced by a "modifier" sent in the substantially previous on-line transaction. The seed as will be understood, could for instance be essentially a stored value of the same type as would be used as a challenge in the first type of application, in which case the modifier would be simply a stored challenge. Or, it could also be a value that is updated in various ways, such as cryptographically, depending on the seed modifier(s) sent. The seed thus allows the terminal to develop a valid challenge that would be unpredictable even to someone with access to the terminal's inner workings.

In either type of on-line transaction, the response should depend on the challenge and could be the endorsement as described here. Or the response could be a conventional cryptographic authentication, as are well known in the art, and the full endorsement could be stored at the terminal for later forwarding or audit.

In off-line transactions, a challenge value is believed preferable that is similarly unpredictable as with an on-line transaction. A terminal that goes on-line sometimes, it will be understood, can update its challenge seed at those times and advance its challenge values through a sequence at least depending on this challenge seed. The result, it will be understood, is a sequence of challenge values that is unpredictable at least across on-line transactions.

DETAILED DESCRIPTION OF PREFERRED EMBODIMENTS

Figure 3:
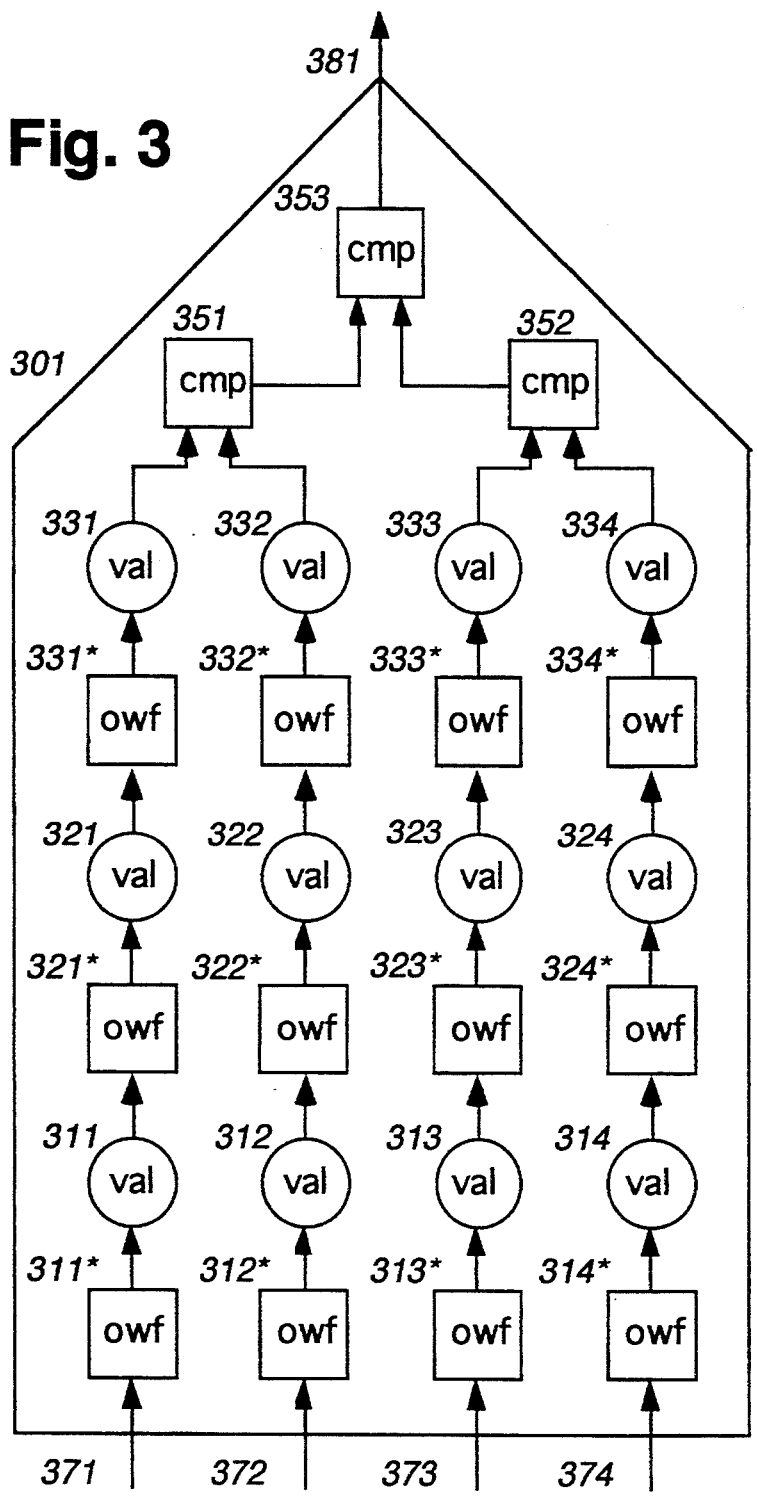
FIG. 3 shows an exemplary one-time signature structure in accordance with the teachings of the present invention.

While it is believed that the notation of FIGS. 3 and 4 would be clear to those of ordinary skill in the art, it is first reviewed here for definiteness. Several symbols are used: circles stand for register values; house shaped blocks to be described with reference to FIG. 3 indicate one-time signatures; round-corner rectangles symbolize compression cascades; and diamond boxes are used to represent public key digital signatures. The lines and arrows show the edges that define the flow of outputs to inputs; arrows entering or leaving a diagram of course show the inputs or outputs, respectively, of the diagram.

The notation of FIG. 5 is a tabular arrangement of numbers and special symbols, the meaning of which will be described later with reference to that figure.

Turning now to FIG. 3, a preferred embodiment of a one-time signature structure will now be described in detail.

House shaped box 301 shows the one-time signature itself. Its shape is used in FIG. 4, to be described, as an icon for the one-time signature. The particular dimensional parameters, 4 inputs and 3 internal stages, are chosen as illustrations for clarity and definiteness, but such choices are not intended to limit possible values or to imply the need for such a rectangular structure. Some embodiments may use smaller parameter values and others larger parameter values such as, for instance, 8 by 8. There are four input values, 371 through 374. Each input is mapped by a one way function, 311* through 314*, to produce an intermediate value 311 through 314, respectively. The next stage uses these values, 311–314, as inputs to the one-way functions 321*–324*, respectively, whose outputs define values 321–324, respectively. The final stage of one-way functions, 331*–334*, takes the values 321–324 as inputs and produces values 331–334, respectively.

The outputs of the final stage of one-way functions are shown being compressed by a hierarchy of two-input compressors for definiteness, although any suitable compressing structure might be used. Values 331 and 332 are compressed by compressor 351, whose output feeds compressor 353; values 333 and 334 are compressed by compressor 352, whose output feeds the other input of compressor 353. The output of compressor 353 is shown as the final output 381 of the one-time signature.

Two types of operations are performed on houses. One operation is computing there output by taking the input values 371–374 through the chains of one-way functions and through the compression hierarchy just described to produce output value 381. The other operation is forming the one-time signature, as depicted in box 221 already mentioned. The message to be signed is taken as a set of digits, as is well known in the art, and the one-way function chain corresponding to each digit is evaluated to a depth corresponding to the value of that digit. The output values corresponding to these one-way functions, one per digit, are the one-time signature.

Turning now to FIG. 4, a preferred embodiment of a compact endorsement signature will now be described in detail. The particular dimensional parameters, 4 streets each of 4 houses has been chosen for clarity in exposition and definiteness, but such choices are not intended to limit possible parameters or to imply the need for such a regular structure. It is believed, however, that a roughly equal number of streets and houses does represent a good tradeoff. Larger parameter values, such as 8 streets of 8 houses, are believed also be a suitable choice in some circumstances.

The two level approach is believed best for the intended use. However, other structures can readily be derived from the inventive concepts disclosed here. Just to give one further exemplary embodiment, although not shown explicitly for clarity, it will be understood by those of skill in the art how a cascade can be split in two by a single compress inserted above it, without changing substantially the computation or register requirements, This would, for instance, allow the number of edges transferred to be reduced substantially.

Figure 4A:
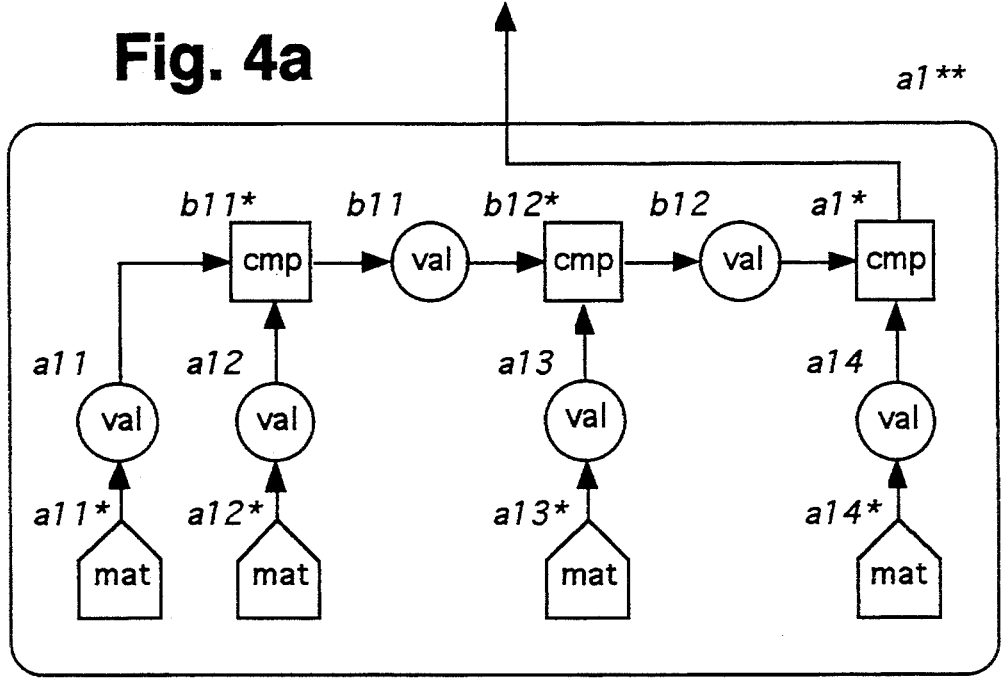
FIG. 4a-d are exemplary first level cascade structures and FIG. 4e is an exemplary second level cascade structure.
Figure 4B:
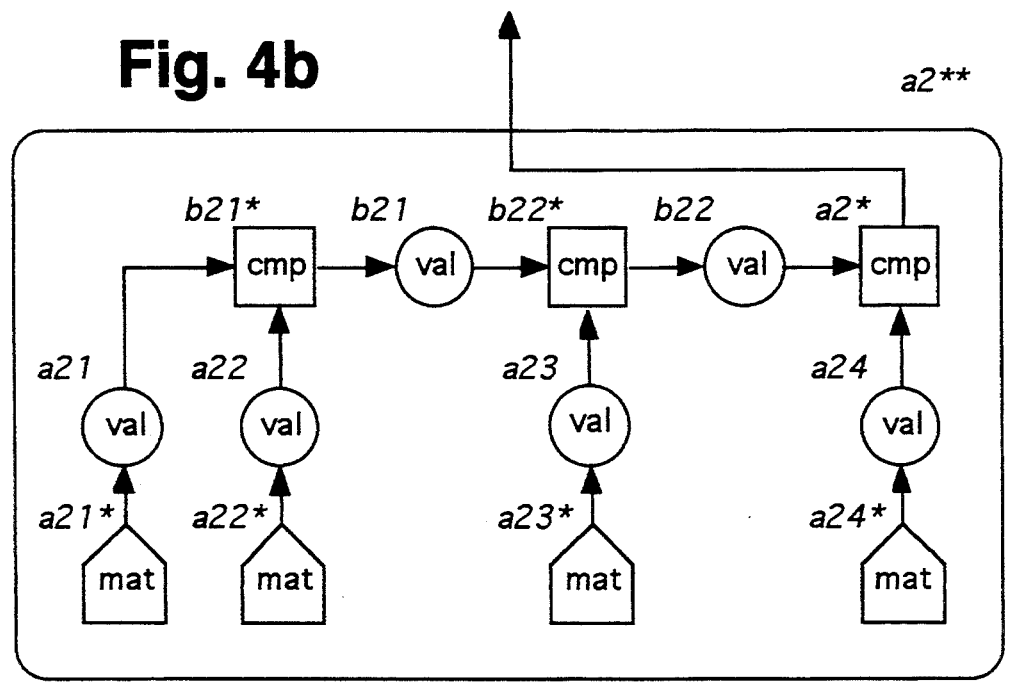
Figure 4C:
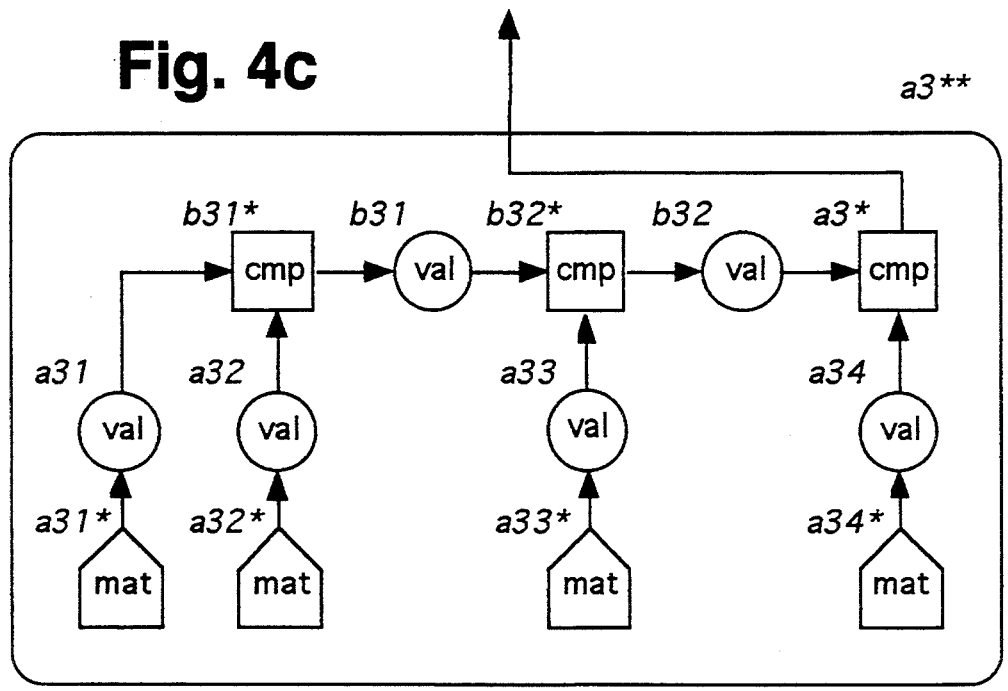
Figure 4D:
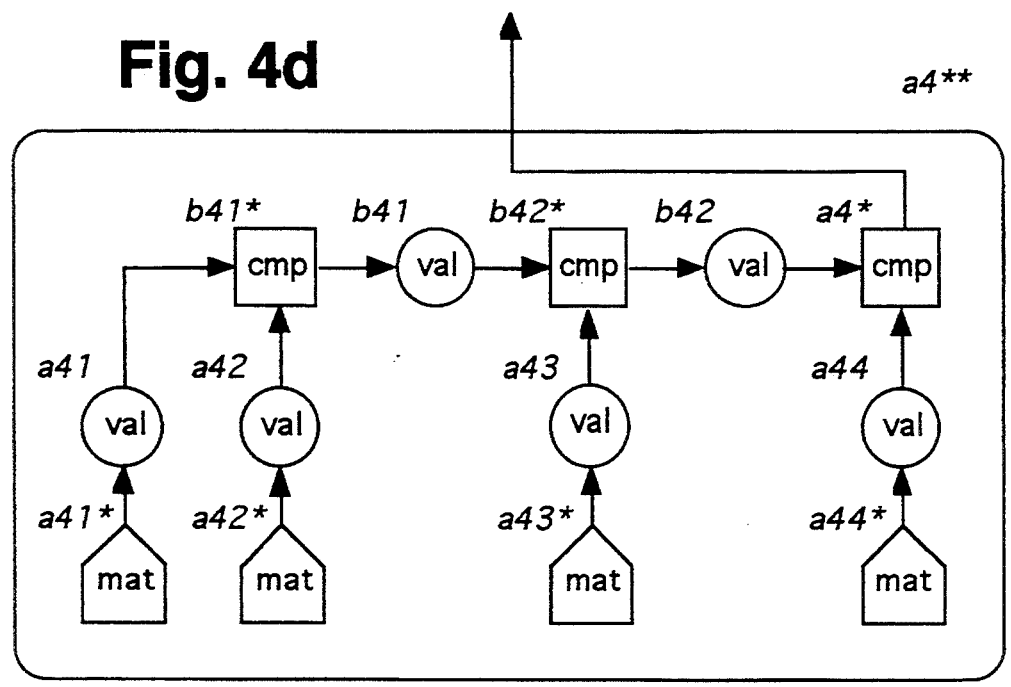
Figure 4E:
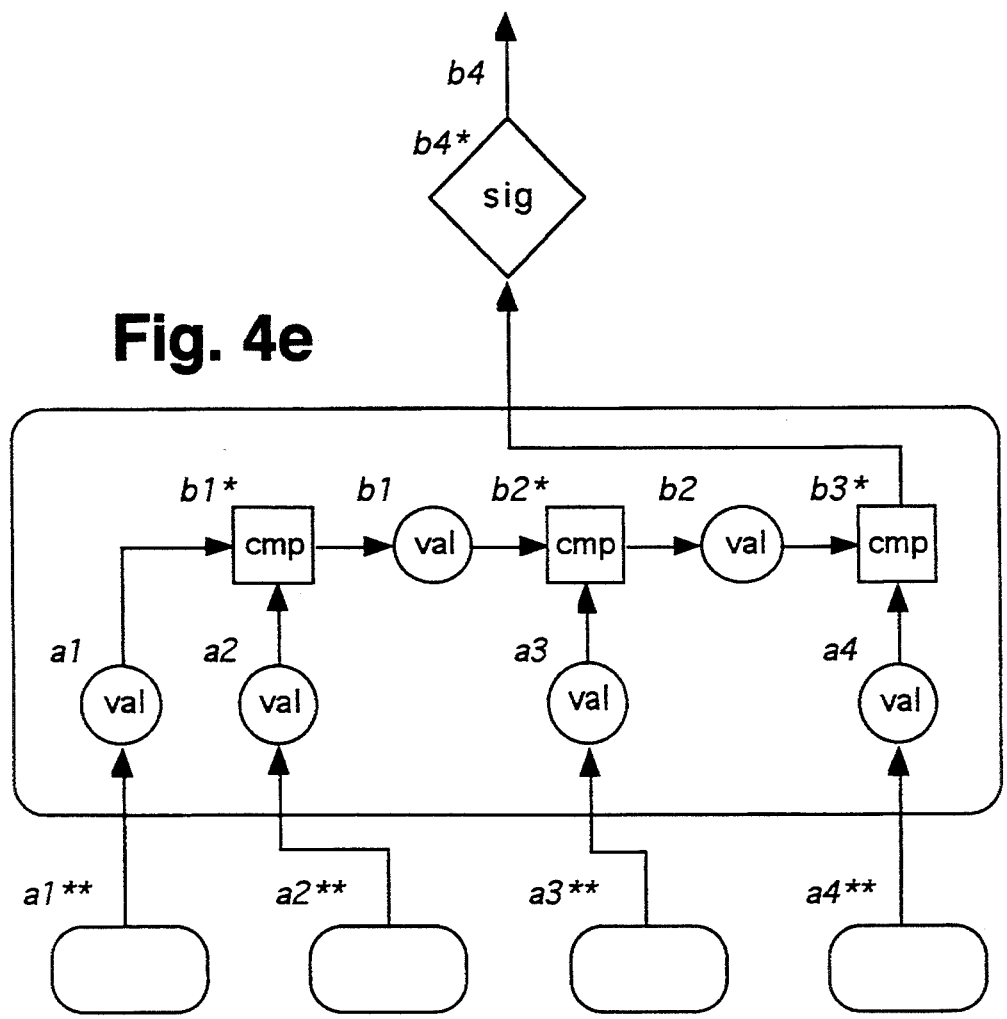

Round-corner box a1** denotes a part of the structure referred to again in FIG. 4e, and may be called a street of 4 houses a11* through a14*, having output values a11 through a14, respectively. Each house stands for a one-time signature, as has already been described with reference to FIG. 3. Compressor b11* takes its inputs from values a11 and a12 and produces output value b11. Compressor b12* takes value b11 and value a13 as inputs and produces output b12. Similarly compressor a1* takes value b12 and a14 as inputs and produces output value to be further described with reference to FIG. 4e.

In like manner, round-corner box a2** denotes a part of the structure referred to again in FIG. 4e, and may be called a street of 4 houses a21* through a24*, having output values a21 through a24, respectively. Each house stands for a one-time signature, as has already been described with reference to FIG. 3. Compressor b21* takes its inputs from values a21 and a22 and produces output value b21. Compressor b22* takes value b21 and value a23 as inputs and produces output b22. Similarly compressor a2* takes value b22 and a24 as inputs and produces output value to be further described with reference to FIG. 4e.

Again in the same way, round-corner box a3** denotes a pan of the structure referred to again in FIG. 4e, and may be called a street of 4 houses a31* through a34*, having output values a31 through a34, respectively. Each house stands for a one-time signature, as has already been described with reference to FIG. 3. Compressor b31* takes its inputs from values a31 and a32 and produces output value b31. Compressor b32* takes value b31 and value a33 as inputs and produces output b32. Similarly compressor a3* takes value b32 and a34 as inputs and produces output value to be further described with reference to FIG. 4e.

For the final similar street, round-corner box a4** denotes a part of the structure referred to again in FIG. 4e, and may be called a street of 4 houses a41* through a44*, having output values a41 through a44, respectively. Each house stands for a one-time signature, as has already been described with reference to FIG. 3. Compressor b41* takes its inputs from values a41 and a42 and produces output value b41. Compressor b42* takes value b41 and value a43 as inputs and produces output b42. Similarly compressor a4* takes value b42 and a44 as inputs and produces output value to be further described with reference to FIG. 4e.

In FIG. 4e, the four round-corner boxes a1 through a4, with their corresponding output values a1 through a4, respectively, are shown as inputs to a compression tree. The first compressor b1* takes its input from values a1 and a2; its output is value b1. Compressor b2* takes this output b1 and combines it with value a3 to produce value b2. In like fashion, compressor b3* transforms this output value b2 and value a4 into output b3*. Finally, this output value b3 serves as message input to public key digital signature producer b4* to produce compact endorsement signature b4.

Turning now to FIG. 5, the exemplary inventive structure already described with reference to FIG. 4 will now be provided with an operational description.

Each row of the table shown in FIG. 5 corresponds to a single endorsement. The rows of the table are numbered outside the table. Each column in the table corresponds to preferably nonvolatile register locations used to store values between endorsements. The carrot symbol ">" marks entries whose value has changed from the last row. A dot "." marks the entry whose value is the output of the house used in the endorsement corresponding to that row.

As will be appreciated, the first 4 columns are for clarity and convenience used to store the street edge values always in their street order positions. Only the part of the row from the entry marked by the dot up until and including the fourth column are needed for the current and any subsequent endorsements based on houses from the current street, except for a single output from any previous endorsement of the current street. The entries preceding the one marked by a dot are therefore largely available, are sometimes used to hold intermediate values, and are ultimately prepared with the values that they will need to contain when the next street is entered.

The last four entries in each row are used to hold the town edge values needed for the current endorsement. These values, as will be appreciated, are also always stored in order positions. As the streets are traversed, the early town edge values corresponding to the streets currently and previously traversed no longer need to be stored. The entries that they occupied may be used as temporary cells for developing and ultimately holding the town edge values that will be needed when the next town is entered.

For clarity in exposition, the town shown in the first rows has lower-case letters in its reference numbers, corresponding directly with the notation of FIG. 4. The second town shown appearing in later rows has all letters in the reference numerals shown in upper case.

Row 1 begins by showing the complete set of values for the first endorsement. Since the dot is on a11, the first house on the first street is used in the one-time signature. As will be apparent, the edge value for the first street, a1, is not needed since the first street is used; the hyphen symbol "-" indicates the lack of significant value held in this entry.

Row 2 shows that no changes in the register values are needed for this endorsement. All column entries except the second, which corresponds to the one-time signatures used in the endorsement, are explicitly transmitted by the endorser to the endorsee.

Row 3, the third endorsement, entails two changed register values, as indicated by the carrots. The first is b11, which is calculated as the compress of a11 and a12.

Such compressions, as will occur later as well, may be taken as example of the "advance edges" function/step 242 already described with reference to FIG. 2. The second, a22, is preparatory for the next street, and is calculated from the second house on the next street, as also shown in FIG. 4b.

Row 4 is the final endorsement for the first street. It requires a compress of b11 and a13 to obtain b12. Also the value of a23 is computed from the house a23*.

Row 5 is the first endorsement of the second street. The edge value a21 is shown as computed. Since an endorsement with house a21 is made, less computation is needed to complete the value of this edge. This extra efficiency is the reason that the first entry is left to be filled in last. The edge value a1 or the first street is needed at this point and it is easily calculated as the compress of b12 and a14. The value of register a24 is computed from the corresponding house. As endorsement has now moved to the second street, a2 is no longer needed.

Row 6 indicates evaluation but not nonvolatile storage of two houses, A21 and A22, and compressing the resulting two edge values to form B21 shown as stored.

Row 7 forms b21 as the compress of a21 and a22 and stores the result in the first house column. The second house column gets the edge value computed from the second house on the third street. The value of B22 is computed in preparation for the second town. First the value of the third house in the second street of the second town is computed and then this is used together with the first edge value of the second street of the new town, mentioned in row 6 above, to form by compression the value B22.

Row 8 begins by taking the first column from b21 to b22 by compressing b21 together with a23. Then a33 is computed from its house. Finally the value of edge A2 is developed, first from computing A24 from its house and then compressing this with B22.

Row 9 fills the first register with the edge formed from the first house on the third street. The fourth column gets the value computed from the fourth house on the third street. The edge needed for skipping the first two streets, b1, is formed by first compressing b22 and a24 to obtain a2 and then compressing this with a1. Because endorsement is now in the fourth street, a3 is no longer needed.

Row 10 involves constructing only the value B31 for the next town. This is the compress of A31 and A32 that are each computed from their respective houses.

Row 11 first takes the first column forward from a31 to b31 by compressing the former with a32. Then a42 is computed from its house and replaces the second column value. In preparation for the next town, B31 is move forward to B32 by compressing with the value of A33 computed from its house.

Row 12 begins by taking b31 into b32 in the first column by compressing with a33 already stored. Also a43 is computed from its house and stored. Also A3 is compressed from B32 stored and A34 computed from its house.

Row 13 initially sets the first column to the value of house a41. Also house value a44 is put in place. To move b1 to b2, first a3 is compressed from b32 and a34, both stored and then this result is compressed with b1. Since endorsement is now in the fourth street, a4 is freed.

Row 14 only entails computing B41 from two values, A41 and A42, that are computed directly from their respective houses.

Row 15 starts out updating a41 into b41 by compressing the former with a42 stored. The second column is given the value of A12 computed directly. To progress B41 into B42, the value of A43 is computed directly from its house and then compressed with B41.

Row 16 also updates its first column by compressing the former value b41 with a43 stored to yield b42. By computing directly from the house, A13 is obtained. To compress B42 into A4, the value of A44 is computed directly from its house.

Row 17 is the first endorsement from the second town. The value of A11 is computed through the endorsement and stored in the first column. And A14 is computed from its house value.

Row 18 requires not register changes. It is identical to row 2, except that it is for the second town. Thus the process between the first and second towns is ready to repeat again between the second and third towns.

As would be obvious to those of ordinary skill in the art, there are many essentially equivalent ways to realize the inventive concepts disclosed. The particular choices that have been made here are merely for clarity in exposition and are sometimes arbitrary. For instance, without attempting to be exhaustive, there are many one-time signature structures, compression structures, hierarchical structurings, possible parameter values, and so on.

It will also be obvious to those of ordinary skill in the art how parts of the inventive concepts and protocols herein disclosed can be used to advantage without necessitating the complete preferred embodiment. This may be more fully appreciated in light of some examples, where in some uses of the inventive concepts, multiple parties may be combined, simple authorizations instead of actual messages may be used, implementations may involve various hardware forms and memory types, and so forth.

Certain variations and substitutions may be apparent to those of ordinary skill in the art. For example: most practical self-authenticating digital signature techniques could be applied instead of the RSA systems used as an example; compression functions may take more than two inputs; hierarchies of compression functions may take any other treelike form; and register re-use patterns that more evenly distribute certain types of access may be preferred for certain technologies.

While these descriptions of the present invention have been given as examples, it will be appreciated by those of ordinary skill in the art that various modifications, alternate configurations and equivalents may be employed without departing from the spirit and scope of the present invention.

What is claimed is:

1. A method for public-key digital authentication of messages, comprising the steps of:
   creating a private key by a signing party;
   making a public key, corresponding to said private key of said signing party, verifiable by at least a receiving party;
   creating a set of one-time signatures;
   forming a compression hierarchy of said one-time signatures;
   forming a public key digital signature, verifiable with said public key, on said compression hierarchy;

storing edges of said compression hierarchy by an endorser;

endorsing by signing with at least one of said one-time signatures and providing stored edge values;

verification of said one-time signature and said edge values supplied and said digital signature on said compression values; and accomplishing the forgoing by said endorser storing substantially less than all edges and computing before each endorsement substantially less than all edges.

2. In the method of claim 1, using a cascade structuring of compression functions.

3. In the method of claim 1, preparing for future endorsements so that they will require substantially less computation.

4. Apparatus for public-key digital authentication of messages, comprising:

means for creating a private key by a signing party;

means for making a public key, corresponding to said private key of said signing party, verifiable by at least a receiving party;

means for creating a set of one-time signatures;

means for forming a compression hierarchy of said one-time signatures;

means for forming a public key digital signature, verifiable with said public key, on said compression hierarchy;

means for storing edges of said compression hierarchy by an endorser;

means for endorsing, comprising means for signing with one of said one-time signatures and means for providing stored edge values;

means for verification of a one-time signature and compression hierarchy values supplied and for verification of said digital signature on said compression values; and means for accomplishing the forgoing by said endorser storing substantially less than all edges and computing before each endorsement substantially less than all edges.

5. In the apparatus of claim 4, means for forming a cascade structuring of compression functions.

6. In the apparatus of claim 4, means for preparing future endorsements so that they will require substantially less computation.

* * * * *